United States Patent [19]
Koike et al.

[11] Patent Number: 5,373,150
[45] Date of Patent: Dec. 13, 1994

[54] LINE TRACING METHOD AND APPARATUS THEREFOR

[75] Inventors: Yasuo Koike; Tokuji Tanaka, both of Tokyo, Japan

[73] Assignee: Koike Sanso Kogyo Co., Ltd., Tokyo, Japan

[21] Appl. No.: 38,696

[22] Filed: Mar. 29, 1993

[30] Foreign Application Priority Data

Mar. 31, 1992 [JP] Japan .................. 4-103882

[51] Int. Cl.5 .................. G05B 19/19; B23K 7/00
[52] U.S. Cl. .................. 250/202; 318/577
[58] Field of Search ............. 250/202; 356/376, 377; 318/577; 364/474.03; 382/60

[56] References Cited

U.S. PATENT DOCUMENTS

| | | | |
|---|---|---|---|
| 3,711,717 | 1/1973 | Rich et al. | 250/202 |
| 4,002,900 | 1/1977 | Sitnichenko et al. | 250/202 |
| 4,207,462 | 6/1980 | Peiffert et al. | 250/202 |
| 4,321,682 | 3/1982 | Koshikawa | 356/376 X |
| 4,371,782 | 2/1983 | Brouwer | 250/202 |
| 4,453,084 | 6/1984 | Brouwer | 250/202 |
| 4,486,654 | 12/1984 | Brouwer | 250/202 |
| 4,493,968 | 1/1985 | Brown | 318/577 X |
| 4,578,574 | 3/1986 | Grant et al. | 250/202 |
| 4,590,356 | 5/1986 | Povlick et al. | 318/577 X |
| 4,613,749 | 9/1986 | Vali | 250/202 |
| 4,672,190 | 6/1987 | Rostkowski et al. | 250/202 |
| 4,764,669 | 8/1988 | Decker et al. | 250/202 |
| 4,872,105 | 10/1989 | Mozayeny | 250/202 X |

Primary Examiner—David C. Nelms
Assistant Examiner—John R. Lee
Attorney, Agent, or Firm—Townsend & Banta

[57] ABSTRACT

A FIG. 1 is taken by a camera having optical/electrical elements arrayed in matrix, signals of pixels of the picture taken by the camera 2 are converted into binary data in a binary circuit 11, and the binary data is temporarily stored in a binary data storage device 12. The reference point 0 is determined on the edge of the figure, and radius L of the circuit scanning line 21 is determined based on the shape of the figure, and reference point 0 and the radius L of the circle scanning line 21 are inputted through an input unit 13. Coordinate data of pixels on the circuit scanning line 21 is operated based on the inputted numeric values in an arithmetic circuit 15. Binary data on pixels corresponding to coordinate data are read in the detector 16. When the pixel corresponding to the edge of the FIG. 1 is detected, a vector directed from the reference point 0 to the pixel is decided, and first and second drives 7, 8 are driven according to the vector.

3 Claims, 6 Drawing Sheets

LINE TRACING METHOD AND APPARATUS THEREFOR

FIELD OF THE INVENTION

The present invention relates to a method for tracing a figure drawn on a drawing paper and a tracer therefor.

BACKGROUND OF THE INVENTION

Parts with contours having curves and bends are cut out from material, for example, steel plate, stainless steel plate, or nonferrous metal plate such as aluminium plate, plastic plate such as acrylic resin plate, or plywood, by using a torch such as a gas cutting torch, a plasma cutting torch or a laser cutting torch.

There are the following methods for continuously controlling the movements of torch: (i) a numerical controlling method in which the position of a torch is designated on an orthogonal coordinate system and the path of the torch directed from the present point to the second point is given by a straight line or arc on a orthogonal coordinate system; (ii) an optical tracing method in which the reference point corresponding to the torch is set on a given portion of a figure, the direction from the reference point to a portion of the line or edge of the figure positioned at a distance from the reference point is detected, and the torch is moved in the detected direction. The latter method is low-cost and handy. Further, in the latter method, a torch can be controlled at a relatively high speed. Therefore, the optical tracing method is widespread.

A typical tracer is disclosed in Japanese patent publication of application No. 16916 of 1974. This tracer, as shown in FIG. 6, comprises a lens 52 rigidly fixed on a housing 51, a photocell 53 mounted on the surface of the lens 52 coaxially with the center of the lens 52, a shaft 55 rotated by a motor 54 mounted on the axis of the lens 52, a generator 56 which has two rotors 56a, 56b rigidly fixed on the shaft 55 at a right angle to each other, and a mirror 58 disposed eccentrically to the axis of the motor 54, and on which an image of a portion of a FIG. 57 on a drawing paper is formed.

The lens 52 is disposed above the FIG. 57, and the motor 54 is driven to rotate the shaft 55, while the mirror 58 scans a point O at distance from the projective point O of the axis of the lens 52, which position depends on an interval between the mirror 58 and the axis of the lens 52 and the tilting angle of the mirror 58. While the mirror 58 scans the edge of the FIG. 57, output of the photocell 53 changes. (Outputs in two orthogonal directions from the generator 56 are detected simultaneously with a change in the output of the photocell 53. The housing 51 is moved according to the detected output from the generator 56 by which the edge of the FIG. 57 can be traced. Accordingly, the edge of the FIG. 57 can be traced by moving the means for moving the housing 51, together with the means for holding a torch or by moving the means for holding a torch according to the output of the generator 56 so that parts with the same contour as that of the FIG. 57 can be cut out from material.

In the above-mentioned tracer, the figure is pre-read, then the edge of the figure is traced. Therefore, in case the figure has a corner with a relatively small radius of curvature, a portion of the contour of parts corresponding to the corner in the figure is formed into a curve with a big radius of curvature.

That is, as shown in FIGS. 6,7, when the lens 52 is disposed at a distance from the FIG. 57, the distance between the projective point O of the axis of the lens on the figure and the scanning point O of the mirror which is set according to the preset tilting angle of the mirror 58 and the distance between the mirror and the axis of the lens 52 is set as pre-reading amount L. Then, when the scanning point O is moved along the edge of the FIG. 57 having the corner with a relatively small radius of curvature, outputs of two orthogonal components from the generator 56 according to the direction from the projective point O to the scanning point O are sent to the means for moving a torch so that the torch is moved passing the projective points O without passing the corner in the figure with the result that the torch moves in a curved path with a big radius of curvature.

In the above-mentioned tracer, when the pre-reading amount L is increased so that the figure can be traced at a high speed and steadily, the radius of curvature of the path of the torch corresponding to the corner in the figure is increased so that tracing accuracy is decreased. On the other hand, when the pre-reading amount L is decreased so that the tracing accuracy is increased, it becomes impossible to trace the figure at the high speed.

Further, in order to increase the pre-reading amount L with a view to increasing the tracing accuracy, it is necessary to decrease the tilting angle of the mirror 58 against the axis of the lens 52, or to alter the focal length of the lens 52 together with bringing the mirror close to the lens 52. However, since the tracer is precision equipment, such a alteration is impossible, in fact, without changing the tracer itself.

SUMMARY OF THE INVENTION

It is an object of the present invention to provide a tracing method in which the above-mentioned problems can be solved.

Another object of the present invention is to provide a tracer in which pre-reading amount can be easily changed.

The first object of the present invention is achieved by a method for tracing a figure while taking a picture of the figure to be traced by a movable camera having plural optical/electrical elements arrayed in matrix, comprising the steps of: setting the reference point at a given point on the picture and setting a circle scanning line which has a center at the reference point 0 and a given radius; converting the picture information taken by the camera into binary signals; scanning pixels of the picture information converted into binary signals in a given direction along the circle scanning line and detecting pixels on which a change in binary signals is found; determining coordinates of the detected pixels and generating coordinate signals; and moving the camera according to the coordinate signals so that the edge of the figure can be traced.

The second object of the present invention is achieved by a tracer comprising: a camera having plural optical/electrical elements arrayed in matrix; a moving means for moving the camera; a conversion means for converting the picture information taken by the camera into binary signals; a storage means for temporarily storing the binary signals generated in the conversion means; an input means for inputting the numeric value of the radius of circle scanning line; a detection means in which data on the binary signals stored in the storage means are read out from the storage means and the binary signals of several pixels and a change in the binary signals are detected by scanning the data along a given circle scanning line about the preset reference point with a given radius; a decision means for deciding a vector directed from the reference point to the pixel on which a change in binary signals is found by the detection means; and a driving means for sending driving signals corresponding to the vector obtained in the detection means to the moving means.

According to the tracing method of the present invention, the radius of a circle scanning line (pre-reading amount) can be set according to the shape of a figure to be traced or the cutting speed of material to be cut so that the figure can be traced. That is, the edge of the figure to be traced can be detected by taking a picture of the figure by a movable camera having plural optical-/electrical elements arrayed in matrix, converting the picture into binary signals, setting the reference point at a given point on the picture and a circle scanning line which has a center at the reference point, and detecting a change in the binary signals while scanning several pixels positioned on the circle scanning line. Then, the coordinate of the detected pixels are determined and coordinate signals are generated. The camera is moved according to the coordinate signals so that the edge of the figure can be traced. Material can be cut by the torch positioned corresponding to the reference point.

Accordingly, the figure can be accurately traced by presetting the radius of the circle scanning line according to the shape of the figure (whether the figure has a corner with a small radius of curvature or not, or whether all of the edge in the figure is formed of a curved line or not), a cutting speed based on the thickness of material and cutting method such as a gas cutting method, plasma cutting method, laser cutting method and others, and the required tracing accuracy at the corner in the figure.

Further, according to the above-mentioned tracer, the radius of the circle scanning line can be previously inputted through an input unit, a figure to be traced can be taken by a camera having plural optical/electrical elements arrayed in matrix, the picture information taken by the camera can be converted into binary signals by the converting means, and the binary signals can be stored in the storage means. Then the stored binary signals can be read. The read binary signals are scanned according to the information on the reference point and on the radius of the circle scanning line, while a change in the read binary signals on several pixels are detected in the detection means, and a vector directed from the reference point to the pixel on which a change in binary signal is found can be decided in the decision means, and the driving signal can be sent to the moving means according to the obtained vector so that the camera can be moved according to the vector, thereby the reference point can be moved along the edge of the figure.

As mentioned above, according to the present invention, the radius of the circle scanning line can be appropriately set based on the shape of the figure so that the figure can be traced with high tracing accuracy.

DETAILED DESCRIPTION OF THE INVENTION

One embodiment of the tracer, according to the present invention, and the tracing method according to the present invention are hereinafter explained.

Figure 1:
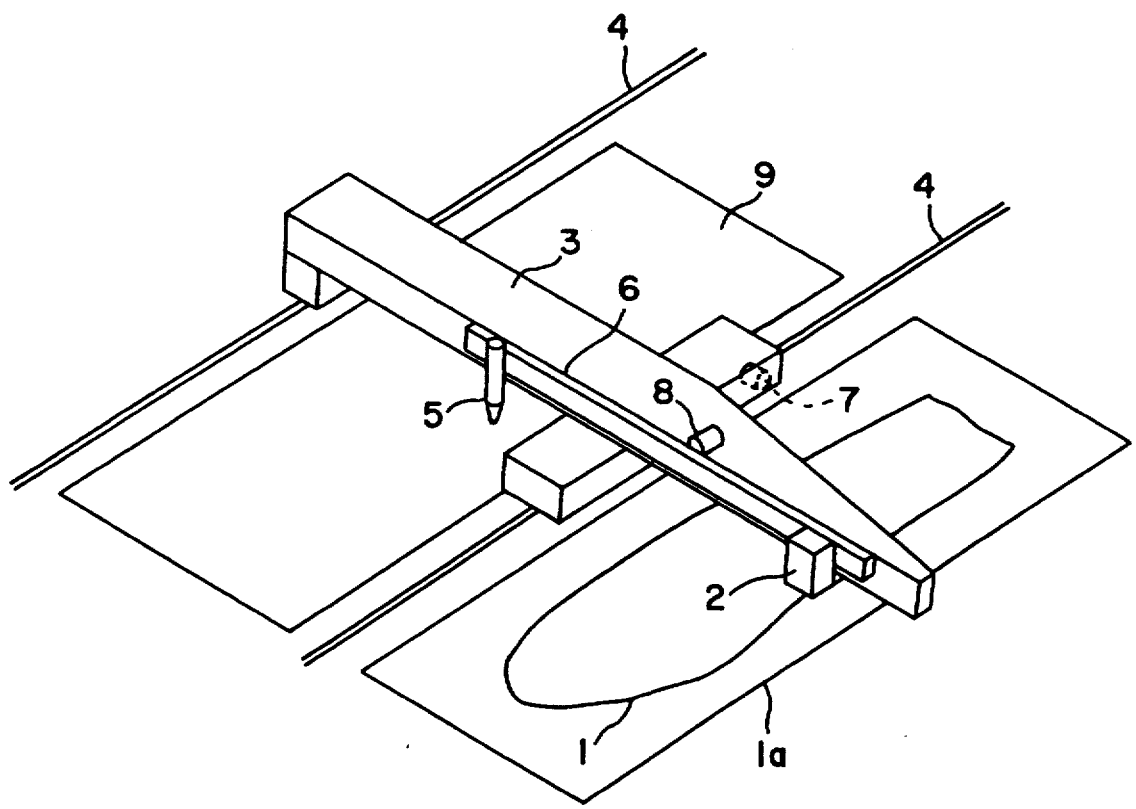
FIG. 1 is a perspective view of a cutting device for cutting material while tracing a figure drawn on a drawing paper, in which the relation between the figure to be traced and a camera is shown.

The tracer, according to the present invention, is connected to a cutter shown in FIG. 1, wherein a FIG. 1 shown in drawing paper 1a is copied by taking a picture of FIG. 1 drawn on the drawing paper 1a by a camera 2.

Next, the cutter is explained referring to FIG. 1. The cutter comprises a portal frame 3. The frame 3 is movably mounted on a pair of rails laid in the X direction. A saddle 6, by which the camera 2 and a torch 5 is held together as a unit, is mounted on the frame 3 in the Y direction perpendicularly intersecting with the rails 4. A first drive 7, including a servomotor for moving the frame 3 on the rail 4 in the X direction, and a second drive 8, including a servomotor for moving the saddle 5 on the frame B in the Y direction, are mounted on the frame 3.

Cuts are made with the above-mentioned cutter as follows: first a picture of a portion of the FIG. 1 is taken; then the picture is processed as mentioned later, by which vector data on the edge of the FIG. 1 is taken from the picture information in a control unit; binary signals in the directions at right angles are outputted according to the vector data from the control unit to the first drive 7 and the second drive 8; and the first drive 7 and the second drive 8 are driven according to the signals by which the frame 3 is moved on the rail 4 in the X direction by a distance which corresponds to the binary signals; and the saddle 5 is moved on the frame 3 in the Y direction by a distance which corresponds to the binary signals so that a part, with the same shape as the FIG. 1, can be cut out of cut material by the torch 5.

FIG. 1 is drawn in pencil or ink on the drawing paper 1a in such a manner that the FIG. 1 can be copied by a conventional optical tracer.

The camera 2 has plural optical/electrical converting elements arrayed in matrix (not shown). A camera on the market can also be applied to camera 2. In the present embodiment, the camera 2 has 256 pieces of optical-/electrical converting elements (pixels) arrayed in matrix, wherein one pixel corresponds to 0.1 mm so that a picture of a line drawn on the drawing paper can be taken and analyzed. Accordingly, the camera 2 has a picture area of 25.6 mm×25.6 min.

Figure 2:
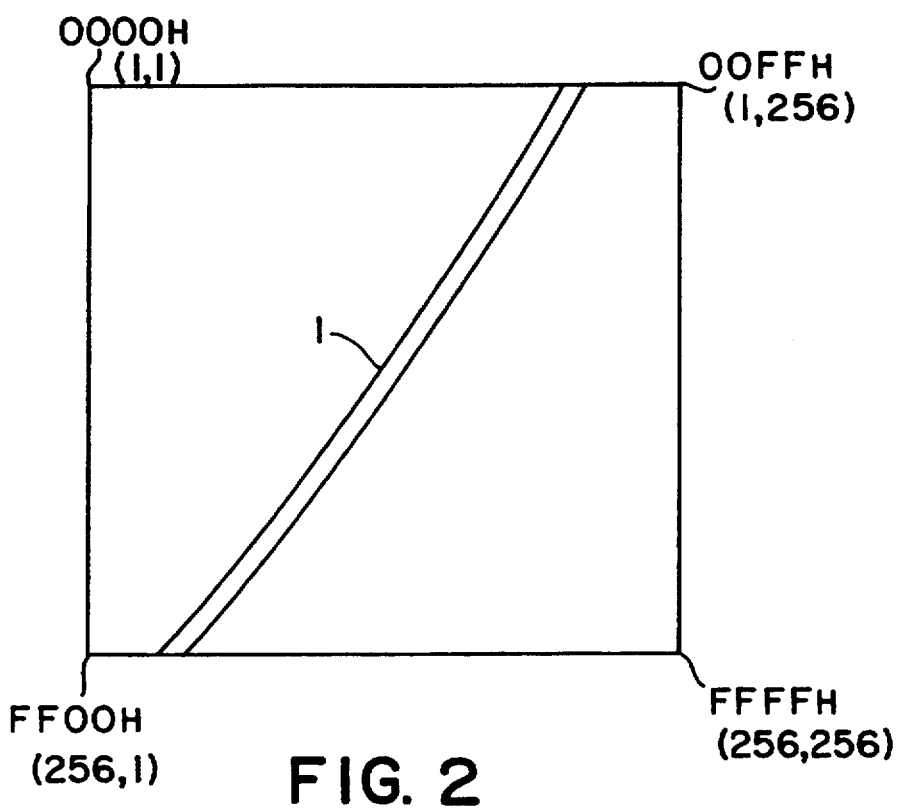
FIG. 2 is a view showing the picture taken by the camera

When a picture of a portion of the FIG. 1 is taken by the camera 2, the picture area is limited within 25.6 mm×25.6 mm as shown in FIG. 2. The information oil the picture taken by the camera 2 is processed by the hereinafter-mentioned control unit, and the camera 2 is moved according to signals outputted from the control unit to trace the FIG. 1, while the torch 5 can be moved while tracing the FIG. 1.

Figure 5:
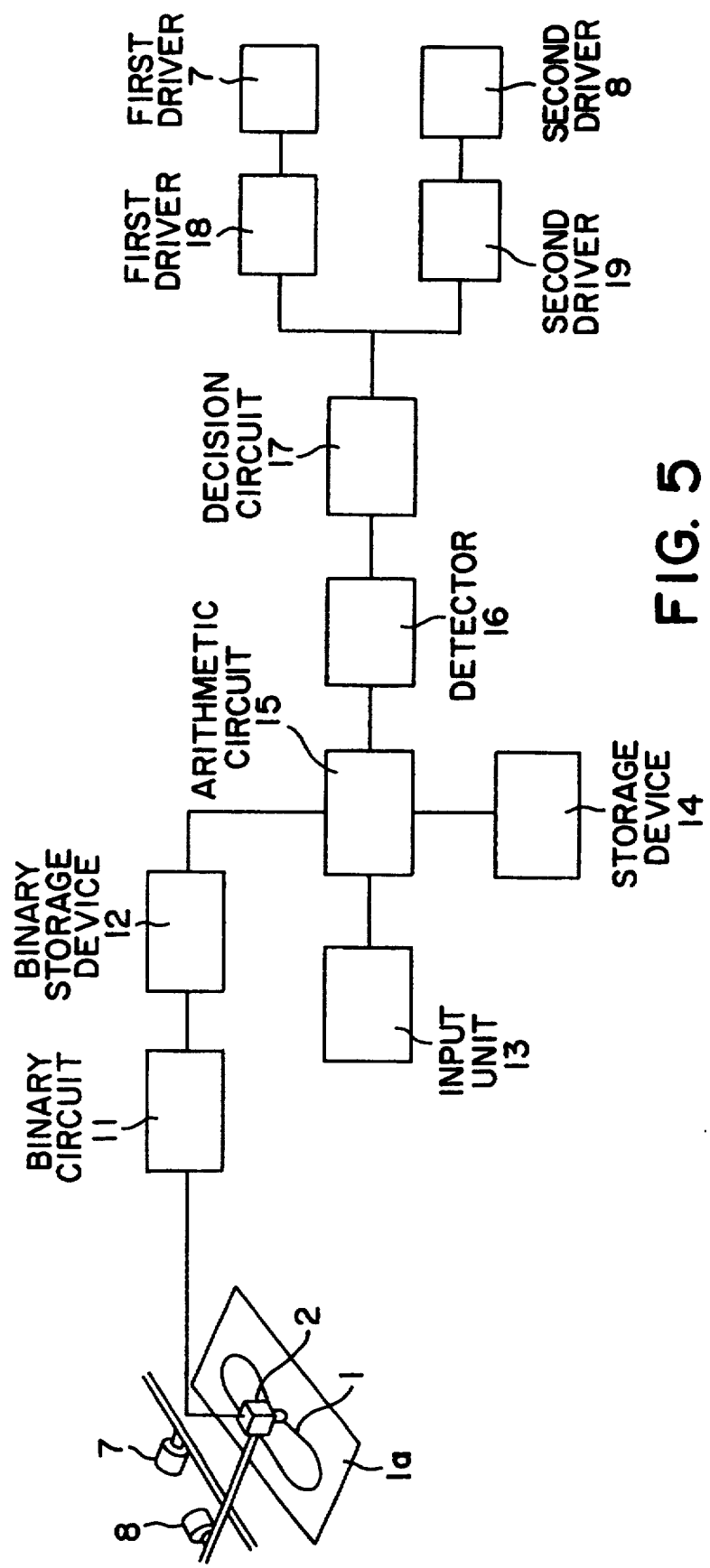
FIG. 5 is a block diagram of the tracing equipment.
Figure 6:
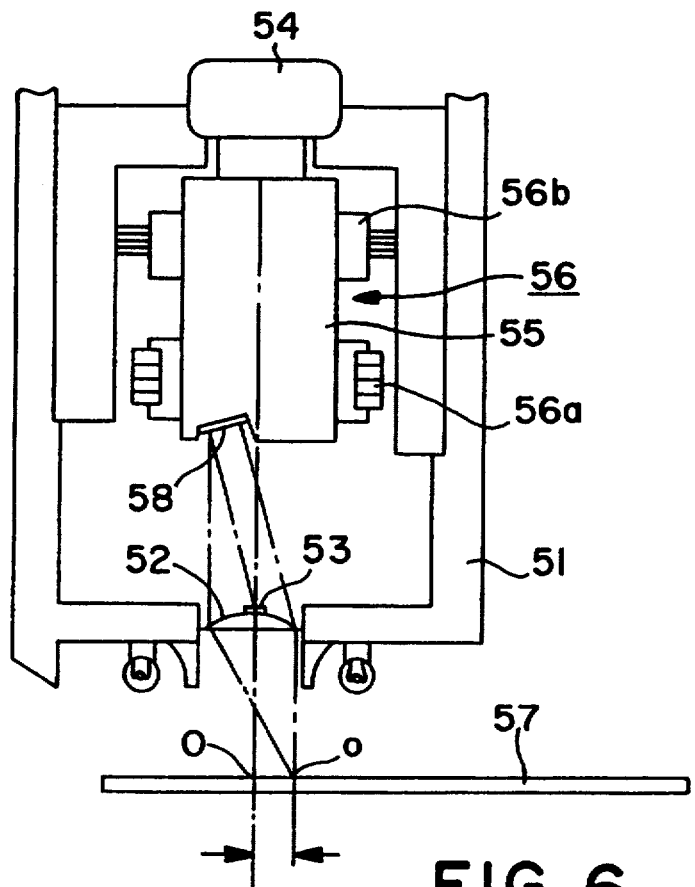
FIG. 6 is a cross-sectional view of a conventional tracer.
Figure 7:
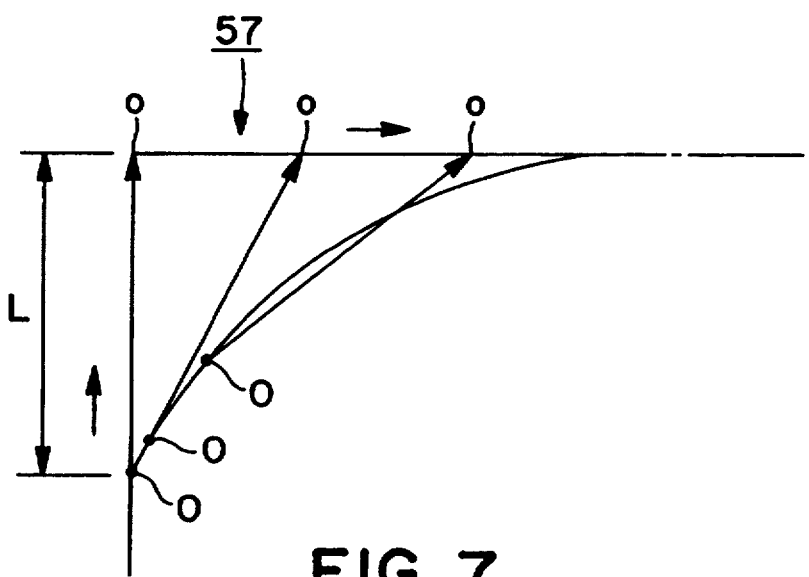
FIG. 7 is a view showing the problem of the conventional tracer.

Next, the control unit is explained referring to FIG. 5. The control unit comprises a binary circuit 11 connected to the camera 2, a binary data storage device 12 connected to the binary circuit 11, an input unit 13, an arithmetic circuit 15 connected to the binary data storage device 12 and the input unit 13, a storage device 14 connected to the arithmetic circuit 15, a detector 16 connected to the arithmetic circuit 15, a decision circuit 17 connected to the detector 16, first driver 18 connected to the first drive 7, and second driver 19 connected to the second drive 8. Signals of several pixels taken by the camera 2 are converted into binary data of "1" and "0" depending on the amount of light which are inputted to several pixels in the binary circuit 1. In this binary circuit 11, a signal "1" is generated for a pixel corresponding to a part of a line of the FIG. 1 shown in FIG. 1, while a signal "0" is generated for a pixel corresponding to a white ground of the drawing paper. Binary data of several pixels are sent in the order of arrangement of several pixels in the picture area.

Binary data of several pixels generated in the binary circuit 11 are temporarily stored in the order of arrangement of several pixels in the picture area in the binary data storage device 12. When first binary data on pixels corresponding to one portion of the FIG. 1 are stored in the binary data storage device 12 and thereafter second binary data on pixels corresponding to another portion of the FIG. 1 are sent from the binary circuit 11, the first binary data are erased, and then the second binary data are stored in the binary data storage device 12.

The input unit 13 includes the feature which operates for inputting the radius of the circle scanning line (amount of advanced reading) through the input unit 13 to the arithmetic circuit 15. The input unit 13, either input equipment in which digital value can be inputted, such as a keyboard, or input equipment in which analog value can be inputted, such as a variable resistor, can be used. The cutter further has another input means for inputting the moving speed of the torch 5, that is, the cutting speed through the input unit 13 to the arithmetic circuit 15, wherein the inputted cutting velocity is utilized as the basic speed of the camera 2 in the X-Y direction.

The preset position data of the reference point, arithmetic expression for operating and specifying coordinate data of pixels to be scanned according to numeric value of radius of circle scanning line inputted from the input unit 13 and position of the reference point are stored in the storage device 14. Further, when the numeric value of the radius of the circle scanning line is inputted from the input unit 13 to the arithmetic circuit 15, the arithmetic circuit 15 reads out the arithmetic expression stored in the the storage device 14 from the storage device 14, operates and specific coordinate data of pixels to be scanned with the arithmetic expression, and the specified coordinate data is stored in the storage device 14 or other storage device.

The detector 16 reads out binary data corresponding to the coordinate data to be scanned, which has been evaluated and specified in the arithmetic circuit 15 from the binary data storage device 12 so that the edge, of the FIG. 1 are detected by deciding pixels of binary data of "1". Then, after edge of the FIG. 1 is detected in the detector 16, the the direction (vector) from the reference point 0 to the pixels of the binary data of "1" is decided from coordinate data of the pixels, and moving speed of the torch 5 in the X direction and moving speed of the torch 5 in the Y direction are operated. Driving signals corresponding to the X direction and Y direction are outputted to the first and second drives 7 and 8, respectively, so the first and second drives can be driven according to the driving signals corresponding to the X direction and the Y direction.

Figure 3A:
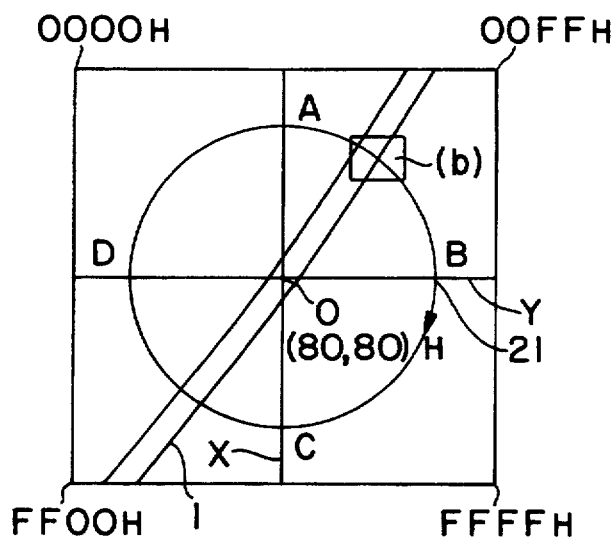
FIG. 3(a) and 3(b) are views showing a portion of the figure with pixels for explaining the tracing method.
Figure 3B:
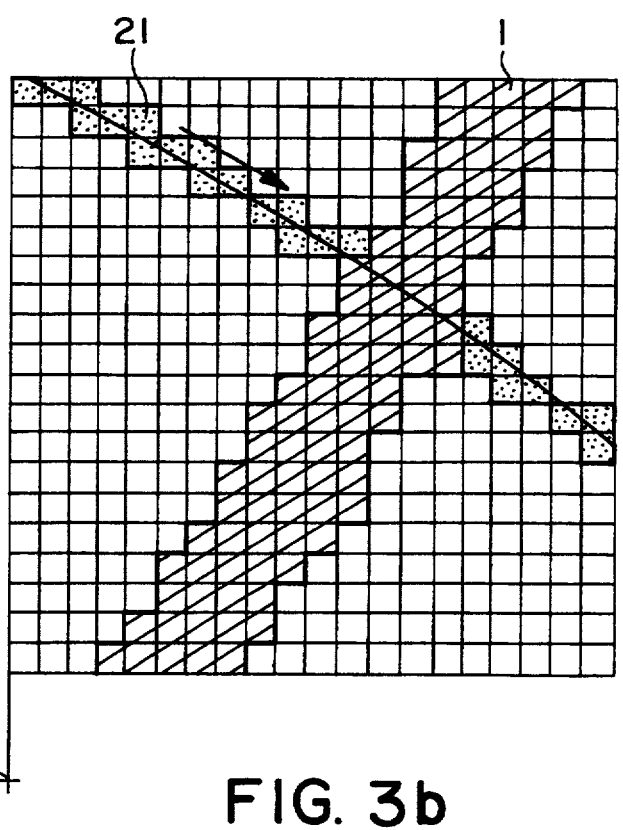

Next, a method for tracing the FIG. 1 with the picture shown in FIG. 2 is explained. FIG. 3(a) shows a binary picture in which the preset reference point 0 and circle scanning line 21 with a radius thereof inputted through the input unit 13. FIG. 3(b) shows an enlarged detail of (b) part in FIG. 3(a). The reference point 0 is located coinciding with the center of the torch 5, the pixel on both the 128 in the longitudinal direction and the 128 in the transverse direction among 256 pieces located longitudinally and transversely is set as the reference point 0. Position of the reference point set to be $(80, 80)_H$. An X-Y rectangular coordinate system which has a center of the reference point 0 can be set by setting a position of the reference point 0.

The numeric value of radius L of circle scanning line 21 is inputted from the input unit 13, and the pixels to be scanned are hereinafter specified. There are various ways for specifying pixels to be scanned. In the present invention, the expression: $L = (X^2 + Y^2)^{\frac{1}{2}}$ is stored in the storage device 14, and the storage device 14, and points of A, B, C and D intersecting with the circle scanning line 21 on several coordinates are set, wherein scanning is made in the direction from A point as the reference point toward B point. For example, when radius L of circle scanning line 21 is set to 10 mm, since pixel corresponds to 0.1 mm, if the reference point 0 is the origin, the position of A point is expressed in the decimal coordinates: (100, 0). L is equal to 100, X value corresponding to Y value is operated by the above-mentioned expression by changing Y from 0 to 100. The obtained coordinates (X, Y) are those of the specified pixels which corresponds to the set circle scanning line.

Therefore, it is possible that when value of radius L of circle scanning line 21 is inputted through the input unit 13, the arithmetic circuit 15 reads out the above-mentioned expression from the storage device 14, and coordinates of pixels on the set circle scanning line are operated in the arithmetic circuit, coordinate data of these pixels are stored in the storage device 14. That is pixels composing the circle scanning line 21 shown in FIGS. 3(a) and (b) are specified. In this embodiment, the radius of the circle scanning line 21 is set to be 10 mm.

As above-mentioned, radius L of circle scanning line is preset and inputted through the input unit 13, and coordinates of pixels to be scanned are operated in the arithmetic circuit according to the inputted value of the circle scanning line and the obtained coordinate data is stored in the storage device 14.

Several pixels of the picture taken by the camera 2 are converted into binary signals in the binary circuit 12, and binary data of several pixels are sent in the order of arrangement of pixels to the binary data storage device 12 in which binary data of all pixels are temporarily stored in the order of arrangement of pixels.

The detector 16 reads out coordinate data of pixels composing circle scanning line 21 from the storage device 14, which has been stored in the storage device 14 and reads out binary data of pixels corresponding to the read out coordinate data from the binary data storage device 12. This binary data are scanned in order of the direction of from point A shown in FIG. 3 (a) toward point B shown in FIG. 3, while binary data of "1" of pixels and binary data of "0" of pixels are identified. The detection of the edge of the FIG. 1 is made by finding pixels having data "1" by this scanning.

Further, in the decision circuit 17, coordinate data of the pixel having data "1" is verified, and coordinates of the identified pixel as data "1" on the coordinate system which has the origin at the reference point 0, that the vector from the reference point 0 to the pixel are decided. The vector is divided into the X component and the Y component. The amount corresponding to the X component and the Y component is outputted to the first and second drivers 18 and 19, respectively.

The first and second drivers 18 and 19, which received the driving signal of the x direction, and the Y direction drive the first and second drives 7 and 8 corresponding to the driving signals, respectively, by which the frame 3 and the saddle 6 are moved in the X direction and in the Y direction, respectively. With the movement of the frame 3 and the saddle 6, the camera 2 and the torch 5 are moved while tracing the FIG. 1.

Figure 4A:
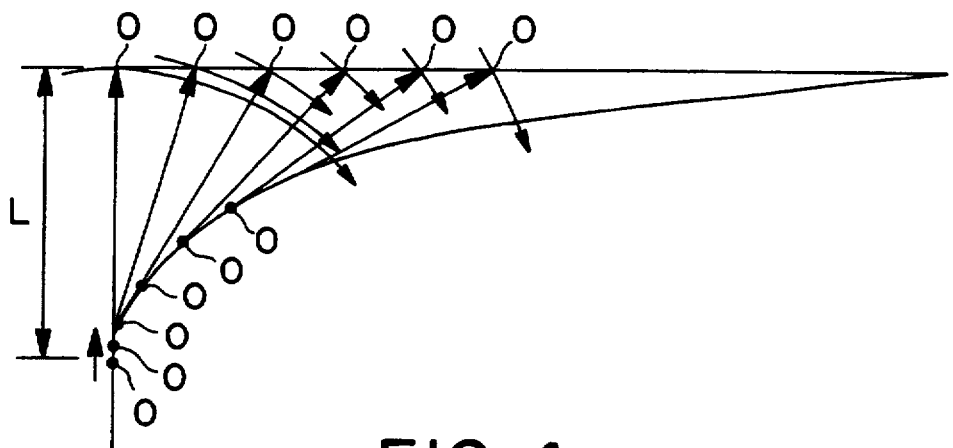
FIG. 4(a) and 4(b) are views explaining the relation between a circle scanning line and the corner R.
Figure 4B:
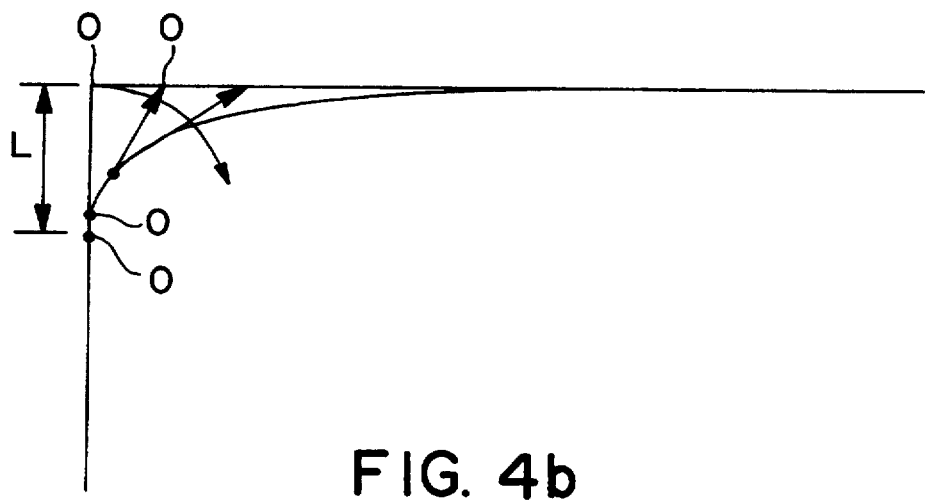

In case radius L of circle scanning line 21 is set to big value in tracing the FIG. 1 as above-mentioned, when the FIG. 1 has a rectangular corner, the focus of the reference point 0 for the rectangular corner of the FIG. 1 draws a big R (radius of curvature)as shown in FIG. 4 (a). Therefore, it is preferable that whether the FIG. 1 has a rectangular corner or a sharp corner or not is observed and radius of circle scanning line 21 is set so that the FIG. 1 can be traced with accuracy.

For example, in case the focus of the reference point 0 when the radius of circle scanning line 21 is set to 10 mm, as shown in FIG. 4(a). If the same figure is traced with the radius of the circle scanning line being set to 5 mm with the same velocity, the focus of the reference point 0 can be approached to the shape of the corner.

As above-mentioned, in the present invention, before tracing the FIG. 1, radius L of scanning line 21 can be set to such a value that the FIG. 1 can be traced most appropriately according to the shape of the FIG. 1, and the set numeric value of radius L of the scanning line can be inputted through the input unit 13. Therefore, according to the present invention, it is possible to improve the tracing accuracy and the cutting accuracy.

What is claimed is:

1. A line tracing method for moving a camera having plural optical/electrical elements arrayed in matrix, comprising steps of:
   setting a reference point 0 at a given point on the picture and setting a circle scanning line about the reference point 0;
   setting a radius according to moving speed of the camera;
   converting picture information taken by the camera into binary signals;
   scanning pixels of the picture information converted and detecting locations of pixels on an intersection of the traced line and the scanning line;
   deciding vectors from the reference point 0 to the location of the pixels on the intersection and;
   moving the camera according to the vector decided so that the edge of the figure can be traced.

2. A line tracing method according to claim 1, wherein the pixel on the intersection of the traced line and the circle scanning line is detected by scanning pixels of picture information along the circle scanning line in a given direction.

3. A line tracing apparatus comprising:
   a camera having plural optical/electrical elements arrayed in matrix;
   a moving means for moving the camera;
   a conversion means for converting picture information taken by the camera into binary signals;
   a memory for temporarily storing the binary signals generated in the conversion means;
   a scanning means for scanning a traced line along a circle scanning line about a reference point 0 by using the binary signal in the memory and for detecting the location of a pixel on an intersection of the traced line and a circle scanning line;
   a setting means for setting a diameter of the circle scanning line according to the moving speed of the camera, and
   a driving means for moving the camera along the traced line by using a vector from the reference point 0 to a pixel of the intersection.

* * * * *